(12) United States Patent
Misaki

(10) Patent No.: US 7,479,719 B2
(45) Date of Patent: Jan. 20, 2009

(54) ALTERNATOR FOR VEHICLE

(75) Inventor: Kouichi Misaki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/717,142

(22) Filed: Mar. 13, 2007

(65) Prior Publication Data
US 2007/0228850 A1 Oct. 4, 2007

(30) Foreign Application Priority Data
Apr. 4, 2006 (JP) ............................. 2006-102724

(51) Int. Cl.
*H02K 11/00* (2006.01)
(52) U.S. Cl. .............................. 310/85; 310/52; 310/64
(58) Field of Classification Search .................... 310/52, 310/64, 85
See application file for complete search history.

(56) References Cited

U.S. PATENT DOCUMENTS

| | | | | |
|---|---|---|---|---|
| 3,538,362 | A * | 11/1970 | Cheetham et al. | 310/68 D |
| 4,126,734 | A * | 11/1978 | Walters | 429/71 |
| 4,896,734 | A * | 1/1990 | Horiuchi et al. | 180/68.3 |
| 4,945,272 | A * | 7/1990 | Ochi et al. | 310/91 |
| 5,550,418 | A * | 8/1996 | Chung | 310/239 |
| 5,646,838 | A * | 7/1997 | Keidar et al. | 363/145 |
| 5,705,867 | A * | 1/1998 | Jeon | 310/68 C |
| 5,775,450 | A * | 7/1998 | Porter et al. | 180/68.1 |
| 5,812,388 | A * | 9/1998 | Keidar et al. | 363/145 |
| 5,914,549 | A * | 6/1999 | Adachi et al. | 310/89 |
| 5,977,669 | A * | 11/1999 | Yoshida et al. | 310/68 D |
| 6,230,677 | B1 * | 5/2001 | Setsuda | 123/184.21 |
| 6,230,833 | B1 * | 5/2001 | Setsuda | 180/68.5 |
| 6,779,622 | B2 * | 8/2004 | Mizorogi | 180/297 |
| 6,841,906 | B2 * | 1/2005 | Kawano | 310/89 |
| 6,911,750 | B2 * | 6/2005 | Bradfield et al. | 310/68 D |
| 6,995,486 | B2 * | 2/2006 | Bradfield et al. | 310/68 D |
| 7,021,973 | B2 * | 4/2006 | Morikaku et al. | 439/709 |
| 7,078,836 | B2 * | 7/2006 | Sakakibara | 310/89 |
| 7,116,032 | B2 * | 10/2006 | Kashihara et al. | 310/242 |
| D563,871 | S * | 3/2008 | Becker et al. | D13/114 |
| 2004/0130233 | A1 * | 7/2004 | Inoue et al. | 310/239 |
| 2004/0200647 | A1 * | 10/2004 | Shingo et al. | 180/65.2 |

(Continued)

FOREIGN PATENT DOCUMENTS

JP          A 4-17551          1/1992

(Continued)

*Primary Examiner*—Darren Schuberg
*Assistant Examiner*—Naishadh N Desai
(74) *Attorney, Agent, or Firm*—Oliff & Berridge, PLC

(57) ABSTRACT

An alternator for a vehicle has a regulator disposed in a casing so as to be exposed from a window of the casing, an input harness and an output harness disposed outside the casing, and an insulating bush disposed between an output terminal and the casing. The regulator controls generation of electric power in response to a control signal sent through the input harness and a connector disposed on the casing. The generated power is output from the alternator through the output terminal and the output harness. The alternator further has a shield cover connected with the insulating bush so as to be unified with the insulating bush. An exhaust pipe heated at a high temperature is disposed over the casing. The shield cover extends between the casing and the exhaust pipe so as to shield the regulator and the harnesses from the exhaust pipe.

10 Claims, 4 Drawing Sheets

U.S. PATENT DOCUMENTS

2004/0256927 A1* 12/2004 Oohashi et al. ............ 310/68 D
2005/0168082 A1* 8/2005 Kondo et al. .............. 310/68 D
2006/0082233 A1* 4/2006 Sugitani et al. ............... 310/85
2006/0214523 A1* 9/2006 Itoh ............................ 310/64
2006/0273671 A1* 12/2006 Oohashi ................... 310/68 D

FOREIGN PATENT DOCUMENTS

JP        A 8-284680        10/1996

* cited by examiner

ALTERNATOR FOR VEHICLE

CROSS-REFERENCE TO RELATED APPLICATION

This application is based upon and claims the benefit of priority of the prior Japanese Patent Application 2006-102724 filed on Apr. 4, 2006 so that the contents of which are incorporated herein by reference.

BACKGROUND OF THE INVENTION

1. Field of the Invention

The present invention relates to an alternator mounted on a vehicle such as a passenger car, a truck or the like.

2. Description of Related Art

A slant nose type vehicle has recently been required to decrease a running resistance in the vehicle or to improve a field of vision for a driver. Further, a wide accommodation space of a vehicle compartment has recently been required to improve comfortability while driving. These requirements narrow an engine room space. In the engine room, an engine, an exhaust pipe including an exhaust manifold, an alternator and the like are disposed.

An exhaust gas is generated in the engine and passes through the exhaust manifold. Finally, the gas is output to the outside through the exhaust pipe. The alternator has various electrical components such as a regulator. The alternator generates an electric power from a rotational force transmitted from the engine and outputs the electric power through a vehicle harness. This electric power is accumulated in a battery or is supplied to current consumers. The regulator receives a control signal from an electric control unit (ECU) through another vehicle harness and controls the generation of the electric power.

The exhaust pipe including the exhaust manifold is heated at a high temperature by the exhaust gas. To efficiently cool the exhaust pipe, the pipe is disposed on a front side of the engine so as to receive a wind from the outside of the vehicle as a cooling air. Therefore, the exhaust pipe is inevitably placed so as to be close to the alternator. In this case, the exhaust pipe gives a radiation heat or/and a transfer heat by conduction to the regulator and the vehicle harnesses of the alternator, so that there is a high probability that the vehicle harnesses and/or the regulator will receive heat damage from the exhaust pipe.

When the regulator is heated at a high temperature due to the radiation heat or the transfer heat by conduction, the regulator cannot continue normal operation. For example, in this case, the alternator is not correctly controlled by the regulator. When the vehicle harness is melted and cut off due to the radiation heat or the transfer heat by conduction, the alternator cannot receive any control signal or cannot supply the electric power to the current consumers and the battery.

To prevent the alternator from receiving any heat damage from the radiation heat or/and transfer heat by conduction given from the exhaust manifold, Published Japanese Patent First Publication No. H08-284680 discloses a thermal protection system wherein a thermal shield plate is fixed to an engine. This plate prevents a wind heated on the exhaust manifold from blowing against the alternator. Therefore, the plate thermally protects the alternator. Further, Japanese Patent Specification No. 2841702 discloses a thermal protection system wherein a duct is disposed on a rear side of an alternator in a vehicle so as to be close to an engine. A cooling air received from the outside passes through the duct and cools the alternator. Therefore, the alternator can efficiently be cooled.

However, in these thermal protection systems, the number of constitutional elements in the vehicle is increased, so that the number of assembling works is inevitably increased. As a result, a cost for manufacturing the thermal protection system is undesirably increased.

SUMMARY OF THE INVENTION

An object of the present invention is to provide, with due consideration to the drawbacks of the conventional thermal protection system, an alternator for a vehicle wherein heat damage to the alternator is efficiently reduced at a low cost without increasing the number of constitutional elements.

According to an aspect of this invention, the object is achieved by the provision of an alternator having a casing, a regulator disposed in the casing so as to be exposed from a window of the casing, a connector disposed on the casing and connected with the regulator, a first harness disposed outside the casing and connected with the connector, an output terminal disposed on the casing, a second harness disposed outside the casing and connected with the output terminal, an insulating bush disposed adjacent to the output terminal, and a shield cover disposed so as to shield at least one of the regulator and the first and second harnesses from an exhaust pipe and is connected with the insulating bush so as to be unified with the insulating bush.

With this arrangement, the regulator controls generation of electric power in response to a control signal transmitted through the first harness and the connector. The generated power is output through the output terminal and the second harness. Although the exhaust pipe is heated at a high temperature and outputs a radiation heat and/or a transfer heat by conduction, the shield cover prevents the radiation heat and/or the transfer heat by conduction from reaching at least one of the regulator and the first and second harnesses. Accordingly, heat damage to at least the one of the regulator and the first and second harnesses can be efficiently reduced.

Further, the regulator detects the generated power to control the generated power. To improve a sensing precision in this detection and to simplify a connection structure in the alternator, the regulator and the harnesses are disposed adjacent to the output terminal. Therefore, when the shield cover is required to shield at least one of the regulator and the harnesses from the exhaust pipe, the shield cover connected with the insulating bush can be made in a small size. Accordingly, the alternator can manufactured at a low material cost.

Moreover, the shield cover is unified with the insulating bush. Accordingly, a unit of the shield cover and the insulating bush can be disposed in the alternator at a low manufacturing cost.

DETAILED DESCRIPTION OF THE PREFERRED EMBODIMENTS

Figure 1:
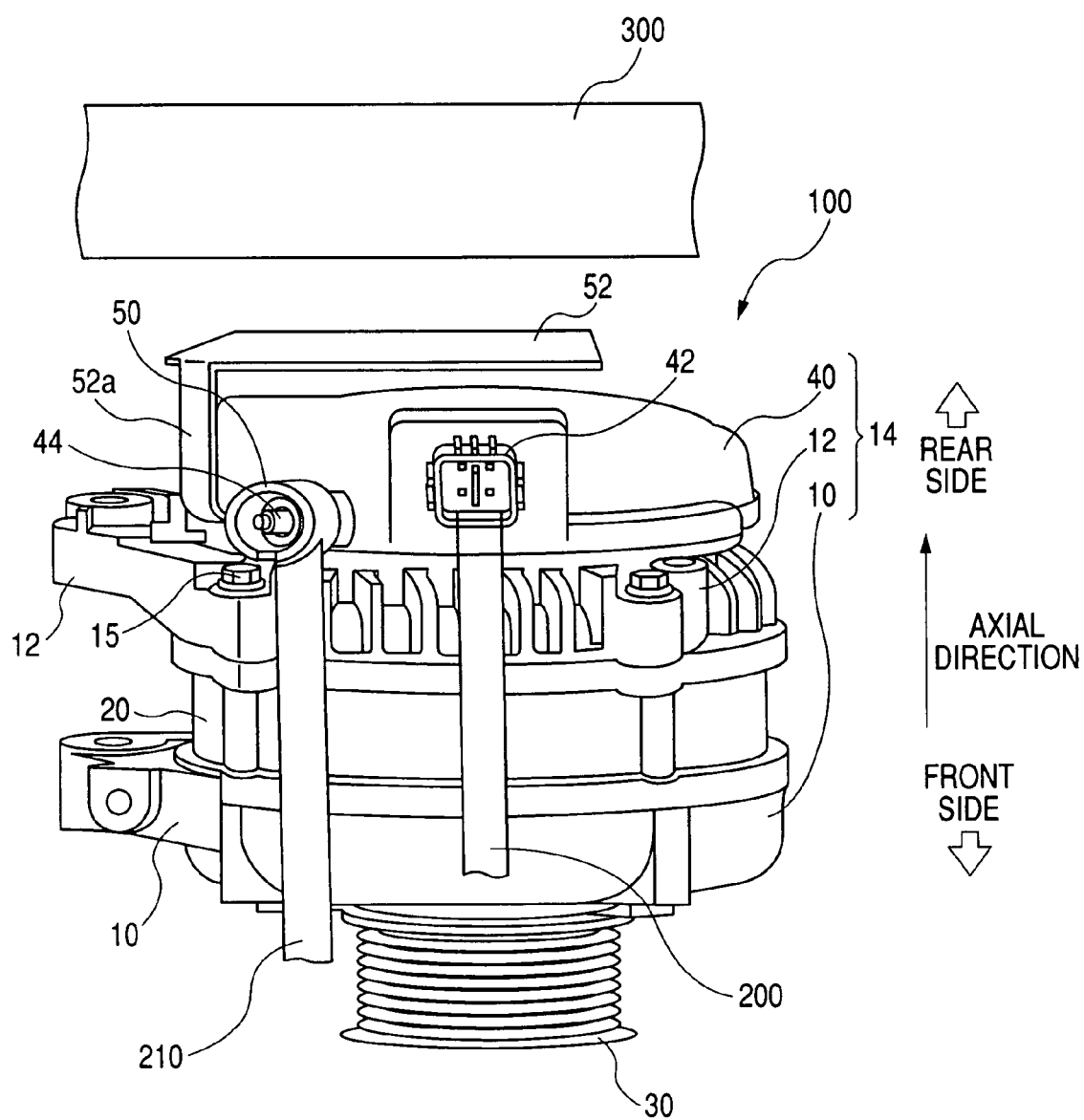
FIG. 1 is a side view of an alternator for a vehicle according to an embodiment of the present invention.

An embodiment of the present invention will now be described with reference to the accompanying drawings, in which like reference numerals indicate like parts, members or elements throughout the specification unless otherwise indicated. However, this embodiment should not be construed as limiting the present invention to a structure of this embodiment, and the structure of this invention may be combined with that based on the prior art.

EMBODIMENT

Figure 2:
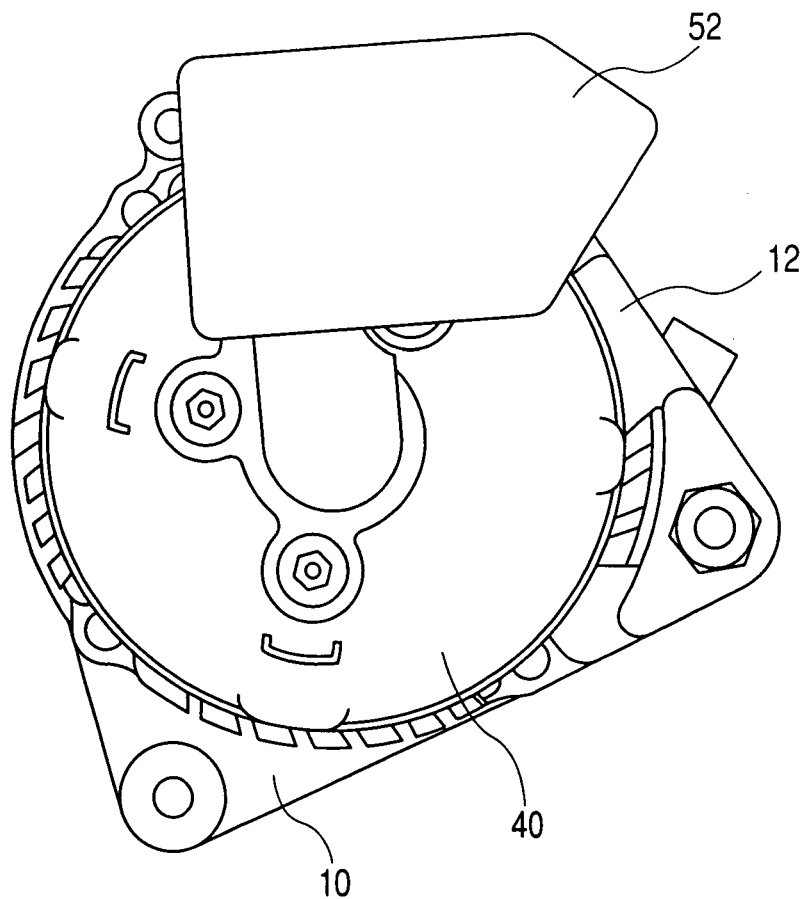
FIG. 2 is a view of the alternator seen from a rear side position of the alternator according to this embodiment.

FIG. 1 is a side view of an alternator for a vehicle according to an embodiment of the present invention and shows a positional relation between the alternator and an exhaust pipe placed on a rear side of the alternator, and FIG. 2 is a view of the alternator seen from a rear side position of the alternator. Although there are many windows on an outer surface of the alternator to receive and output a cooling air, the windows are not shown in FIG. 1 and FIG. 2.

As shown in FIG. 1 and FIG. 2, an alternator 100 for a vehicle has a casing 14, a stator 20, a rotor (not shown) disposed in a center hole of the stator 20, and a pulley 30. The casing 14 has a front frame 10, a rear frame 12 and a rear cover 40 along an axial direction of the alternator 100. The stator 20 is placed between the frames 10 and 12 to be supported by the frames 10 and 12. The rotor is supported by the frames 10 and 12. An end of a rotary shaft (not shown) of the rotor is protruded from the frame 10 toward a front side of the alternator 100. The pulley 30 is fastened and fixed to the end of the rotary shaft. The rear cover 40 is fastened and attached to the frame 12 by nuts 15.

Figure 4:
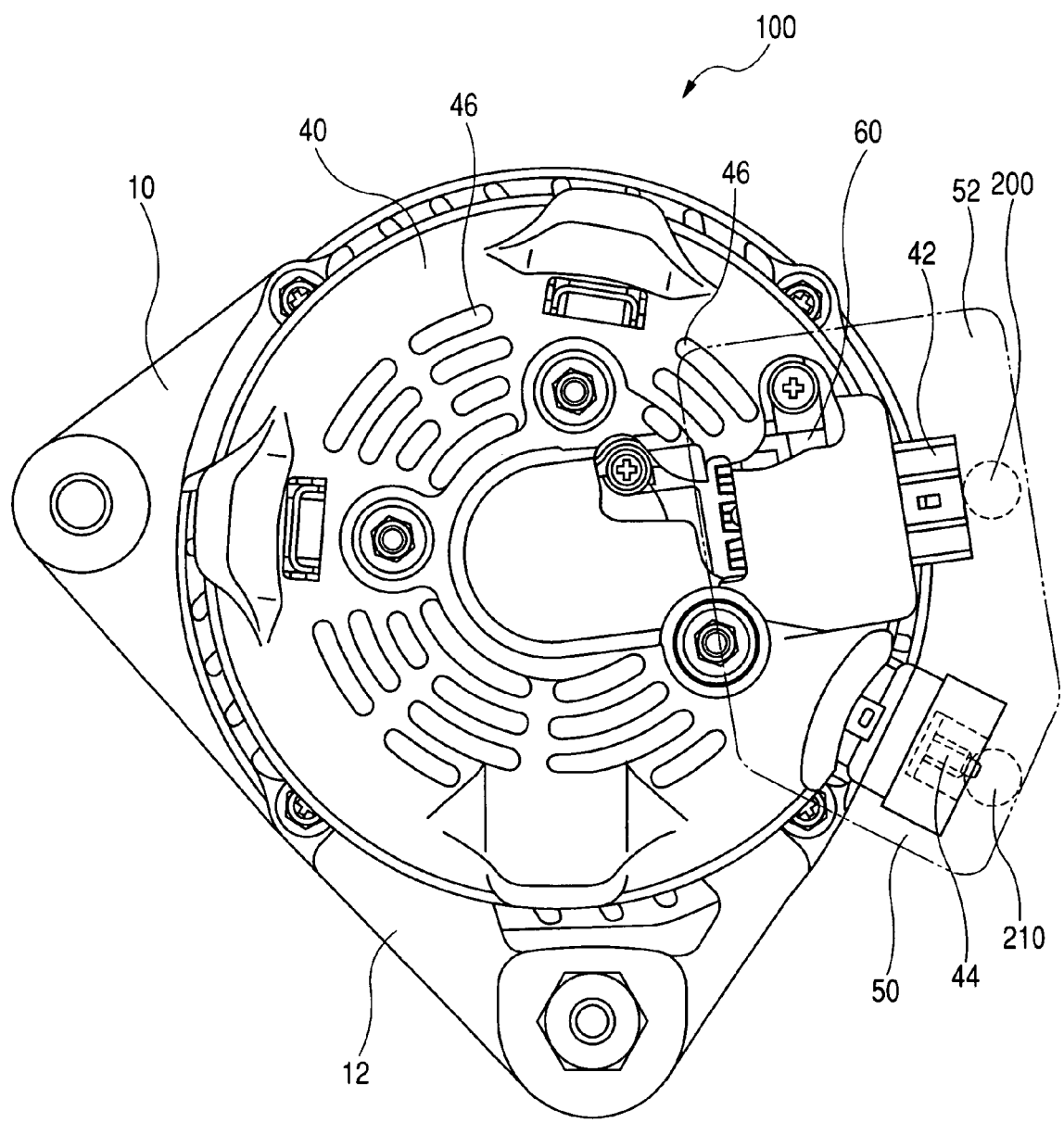
FIG. 4 is a top view of the alternator seen from a rear side according to this embodiment.

The alternator 100 further has electrical components (not shown) such as a rectifier, a brush apparatus and a regulator (not shown in FIGS. 1 and 2, but shown in FIG. 4). These components are disposed to be attached to the rear frame 12 and to be surrounded by the rear frame 12 and the rear cover 40. The alternator 100 further has a connector 42 connected with the regulator so as to expose an end of the connector 42 from the rear cover 40, a signal input harness 200 disposed outside the casing 14 and connected with one of electrical contact points of the connector 42, an output terminal 44 connected with the rectifier so as to expose an end of the terminal 44 from the rear cover 40, an insulating bush 50 disposed adjacent to the terminal 44 so as to surround the terminal 44, and a power output harness 210 disposed outside the casing 14 and connected with the terminal 44. The harness 200 is connected with an external control unit (e.g., electronic control unit). The harness 210 is connected with a battery (not shown) and current consumers (not shown) of the vehicle. Each of the harnesses 200 and 210 extends along a mostly axial direction so as to be in parallel with a side surface of the casing 14. The insulating bush 50 is made of resin and insulates the terminal 44 from the frame 12. The regulator and the harnesses 200 and 210 are easily damaged by a radiation heat or a transfer heat by conduction.

The rotor has a plurality of nail portions (not shown) facing the stator 20 and a coil (not shown) wound around the nail portions, and an N magnetic pole and an S magnetic pole are alternately and changeably produced in the nail portions in response to an electric current supplied from the outside of the alternator 100 through the bush apparatus. A rotational force generated in an engine (not shown) is transmitted to the rotary shaft of the rotor through the pulley 30 to rotate the rotor, and electric power is generated due to an electromagnetic interaction between the rotated rotor and the stator 20. A control signal is transmitted from the external control unit to the connector 42 through the harness 200 and is received in the regulator. The regulator controls the generation of the electric power in the alternator 100 in response to the control signal. The rectifier rectifies an alternating current of the generated electric power. The rectified current is output to the battery and/or the current consumers through the terminal 44 and the harness 210.

Figure 3:
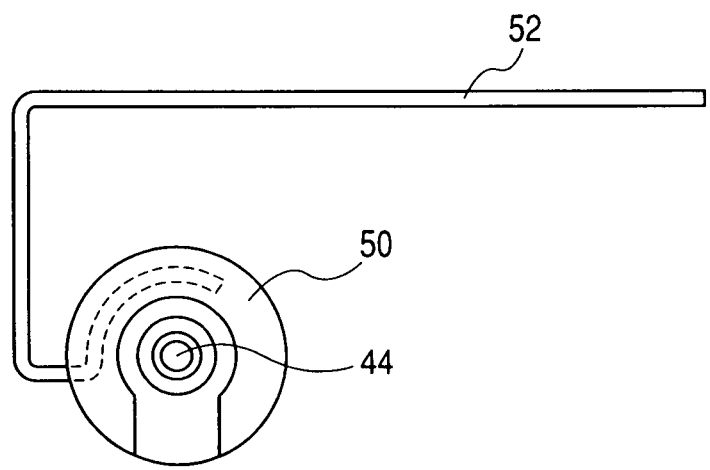
FIG. 3 is a view schematically showing a connection of a thermal shield cover with an insulating bush according to this embodiment.

An exhaust pipe 300 extending from the engine is disposed over the rear cover 40 so as to be placed on the rear side of the alternator 100. An exhaust gas of the engine passes through the exhaust pipe 300 and is output to the outside. Therefore, the exhaust pipe 300 is heated at temperatures ranging from 700° C. to 1000° C. and outputs a radiation heat and/or a transfer heat by conduction toward the rear cover 40 of the alternator 100. The alternator 100 further has a plate-shaped thermal shield cover 52 between the rear cover 40 and the pipe 300. For example, the cover 52 is formed of a metallic plate made of aluminum, iron or the like. The cover 52 has a connection terminal 52a which is bent toward the cover 40 and is connected with the bush 50 so as to unify the cover 52 and the bush 50. A connection structure of the cover 52 and the bush 50 is, for example, shown in FIG. 3. As shown in FIG. 3, an end portion of the connection terminal 52a of the cover 52 is inserted into a receiving opening of the bush 50 to attach and fix the cover 52 to the bush 50.

FIG. 4 is a top view of the alternator 100 seen from the rear side to show a positional relation among the cover 52, a regulator and the harnesses 200 and 210. As shown in FIG. 4, although a regulator 60 disposed in the alternator 100 is covered with the cover 40, the regulator 60 can be seen from the outside of the alternator 100 through windows 46 of the cover 40. The regulator 60 detects the generated power to control the generated power, so that the regulator 60 is disposed near the rectifier to improve a sensing precision in this detection and to simplify a connection structure among the regulator 60, the rectifier, the rotor, the stator, the connector 42 and the output terminal 44. Therefore, the connector 42 connected with the regulator 60 is placed near the terminal 44 connected with the rectifier, so that the regulator 60 is placed near the connector 42 and the terminal 44 so as to be adjacent to the terminal 44. Further, the harnesses 200 and 210 connected with the connector 42 and the terminal 44 is adjacent to the terminal 44.

With this placement, when the regulator 60 and the harnesses 200 and 210 are seen from the exhaust pipe 300 shown in FIG. 2, the regulator 60 and the harnesses 200 and 210 are placed near the terminal 44. The thermal shield cover 52 extends on a plane almost perpendicular to the axial direction and has a shape so as to shield the whole regulator 60 and the harnesses 200 and 210 from the exhaust pipe 300.

Accordingly, because the cover 52 is fixed to the bush 50 disposed near the terminal 44, the cover 52 can easily shield the regulator 60 and the harnesses 200 and 210 placed near the terminal 44 from the exhaust pipe 300 at a low manufacturing cost so as to prevent a radiation heat and a transfer heat by conduction output from the exhaust pipe 300 from being directly given to the regulator 60 and the harnesses 200 and 210. As a result, the cover 52 can efficiently reduce heat damage to the regulator 60 and the harnesses 200 and 210.

Further, because the regulator 60 and the harnesses 200 and 210 are concentrated in a narrow space, the cover 52 can be formed in a small size on the plane almost perpendicular to the axial direction. Accordingly, heat damage to the regulator 60 and the harnesses 200 and 210 can be efficiently reduced at a low material cost by using only the cover 52.

Moreover, because the cover 52 has the connection terminal 52a inserted into an opening of the bush 50 to unify the cover 52 and the bush 50, the alternator 100 having the cover 52 and the bush 50 can be easily manufactured. Furthermore, because the cover 52 made of a metallic plate is used, the cover 52 can have a high heat resistance.

In this embodiment, each of the harnesses 200 and 210 extends along the mostly axial direction, so that the harness extends so as to be almost perpendicular to an extending surface of the cover 52. However, an extending direction of each harness is not limited to this direction. For example, each harness may extend almost in parallel or obliquely to the extending surface of the cover 52.

Further, the exhaust pipe 300 is placed on the rear side of the alternator 100 and extends almost perpendicular to the axial direction. However, the pipe 300 may extend obliquely to the axial direction on the rear side of the alternator 100. Further, the pipe 300 may be placed over the side surface of the casing 14 so as to extend almost in parallel or obliquely to the side surface of the casing 14. In this case, the cover 52 is placed over the side surface of the casing 14 so as to shield the harnesses 200 and 210 and the regulator 60 from the pipe 300.

MODIFICATION

This embodiment should not be construed as limiting to the cover 52 connected with only the bush 50. For example, the cover 52 may be fixed to the rear frame 12 or another member (e.g., rear cover 40 or the like) fixed to the rear frame 12 or the front frame 10 at one or more fixing points, in addition to the bush 50.

Figure 5:
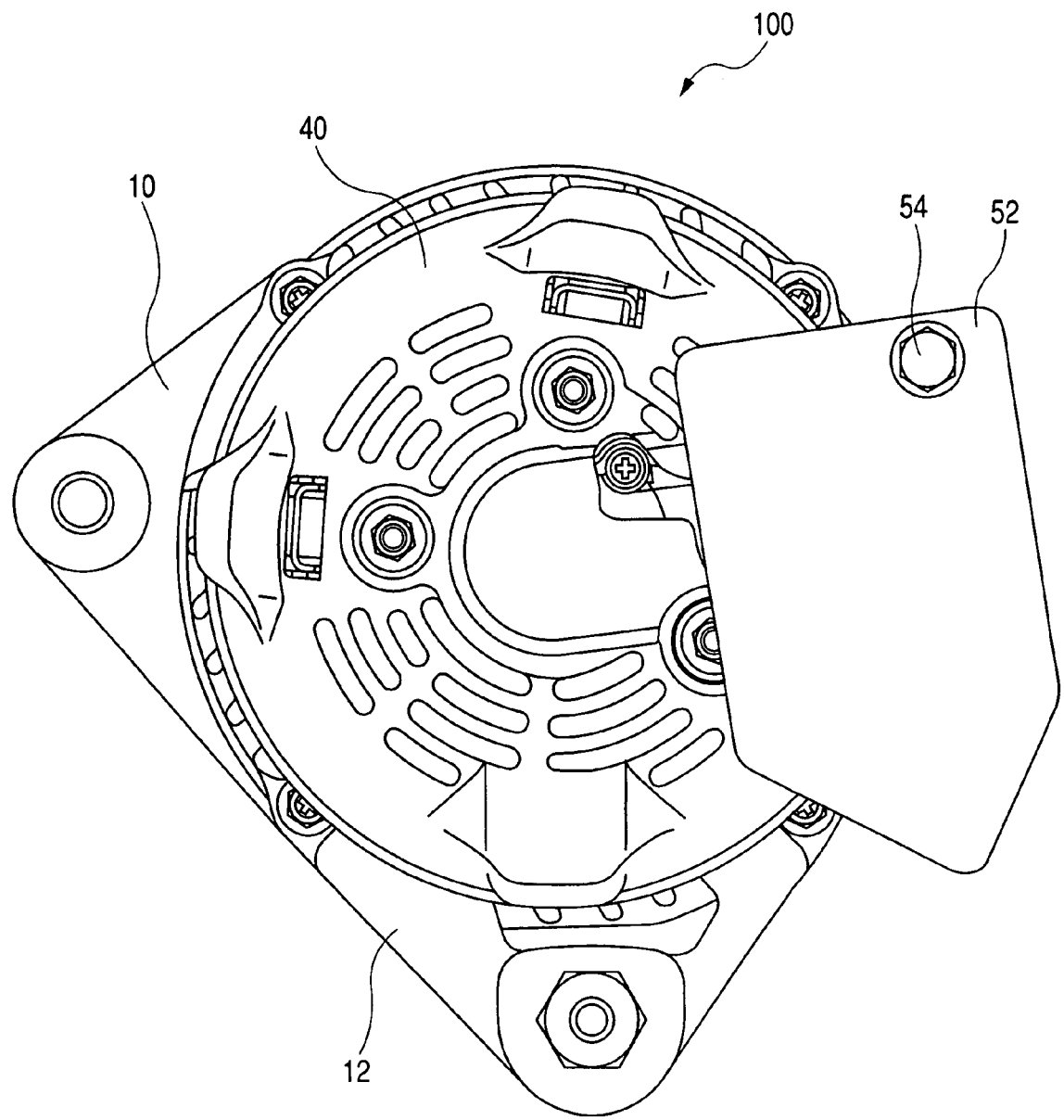
FIG. 5 is a top view of the alternator seen from the rear side according to a modification of this embodiment.

FIG. 5 is a top view of the alternator 100 seen from the rear side according to a modification of this embodiment to show the cover 52 fixed to the rear frame 12 and the bush 50. As shown in FIG. 5, the cover 52 is directly fastened and fixed to the rear frame 12 at a connecting point by a nut 54 or is fixed to the rear frame 12 through another member (not shown). The connecting point of the cover 12 is placed far away from the connection terminal 52a or is placed almost opposite to the connection terminal 52a with respect to the center of the cover 12.

Accordingly, because the cover 52 is fixed to the frame 12 or the like, in addition to the bush 50, vibration proof of the cover 52 can be improved, and the connection of the cover 52 with the frame 12 or the like can prevent the cover 52 from coming off from the alternator 100 or being damaged. Therefore, the cover 52 can reduce, for a long time, a radiation heat or a transfer heat by conduction given from the exhaust pipe 300 to the regulator 60 and the harnesses 200 and 210.

What is claimed is:

1. An alternator, disposed with an exhaust pipe in a vehicle, for generating electric power in the vehicle, the alternator comprising:
   a casing having a cover with a window, the cover being disposed on a first side of the alternator;
   a pulley, disposed on a second side of the alternator opposite to the first side, that receives a rotational force;
   a regulator, disposed in the casing so as to be exposed from the window, which controls electric power generated from the rotational force according to a control signal;
   a connector disposed on the casing and connected with the regulator;
   a first harness, disposed outside the casing and connected with the connector, through which the control signal is transmitted to the regulator;
   an output terminal disposed on the casing;
   a second harness, disposed outside the casing and connected with the output terminal, through which the electric power generated within the casing is output;
   an insulating bush disposed adjacent to the output terminal to insulate the output terminal from the casing; and
   a shield cover, connected with the insulating bush so as to be unified with the insulating bush, which is disposed over the casing between the window and the exhaust pipe or between one of the first and second harnesses and the exhaust pipe so as to shield at least one of the regulator and the first and second harnesses from the exhaust pipe.

2. The alternator according to claim 1, further comprising a fixing member which fixes the shield cover to the casing at one or more connection points of the shield cover.

3. The alternator according to claim 2, wherein the casing has a front frame, a rear frame and a rear cover, the output terminal is disposed on the rear cover, and the fixing member fixes the shield cover to the front frame, the rear frame or the rear cover.

4. The alternator according to claim 1, wherein the shield cover is made of a metallic plate.

5. The alternator according to claim 1, wherein the shield cover has a connection terminal inserted into an opening of the insulating bush.

6. The alternator according to claim 1, wherein each of the first and second harnesses is disposed so as to be almost perpendicular to a plane on which the shield cover extends.

7. The alternator according to claim 1, wherein each of the first and second harnesses is formed in a plate shape and extends over at least the one of the regulator and the first and second harnesses.

8. The alternator according to claim 1, wherein the regulator and the first and second harnesses are disposed adjacent to the output terminal, and the shield cover shields the regulator and the first and second harnesses from the exhaust pipe.

9. The alternator according to claim 1, wherein the exhaust pipe is disposed over the cover on the first side of the alternator, and the shield cover is disposed on the first side of the alternator between the cover and the exhaust pipe.

10. The alternator according to claim 1, wherein the exhaust pipe is disposed over a side surface of the casing, and the shield cover is disposed over the side surface of the casing between the casing and the exhaust pipe.

* * * * *